United States Patent
Locker et al.

(10) Patent No.: US 10,747,633 B2
(45) Date of Patent: Aug. 18, 2020

(54) MULTILEVEL FAULT SIMULATIONS FOR INTEGRATED CIRCUITS (IC)

(71) Applicant: Intel Corporation, Santa Clara, CA (US)

(72) Inventors: Kevin Locker, Scottsdale, AZ (US); Sai Ram Dheeraj Lokam, Chandler, AZ (US); Siva Prasad Kota, Bangalore (IN); Massimo Ceppi, Milan (IT); Teo Cupaiuolo, Milan (IT)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/140,496

(22) Filed: Sep. 24, 2018

(65) Prior Publication Data
US 2019/0050307 A1 Feb. 14, 2019

(51) Int. Cl.
| | |
|---|---|
| *G06F 11/26* | (2006.01) |
| *G01R 31/28* | (2006.01) |
| *G06F 30/15* | (2020.01) |
| *G06F 30/33* | (2020.01) |
| *G06F 30/327* | (2020.01) |
| *G01R 31/00* | (2006.01) |
| *G06F 117/02* | (2020.01) |

(52) U.S. Cl.
CPC ........ *G06F 11/261* (2013.01); *G01R 31/2846* (2013.01); *G06F 30/15* (2020.01); *G06F 30/327* (2020.01); *G06F 30/33* (2020.01); *G01R 31/007* (2013.01); *G06F 2117/02* (2020.01)

(58) Field of Classification Search
CPC .......... G01R 31/2851; G01R 31/31704; G01R 31/3181; G01R 31/318342; G01R 31/31835; G01R 31/318357; G01R 31/2846; G01R 31/07; G06F 11/261; G06F 17/5022; G06F 17/504; G06F 17/5009; G06F 30/15; G06F 30/33; G06F 2217/02
USPC ......................................... 716/103, 106–107
See application file for complete search history.

(56) References Cited

U.S. PATENT DOCUMENTS

2015/0121323 A1\* 4/2015 Gou .................... G06F 17/5022
716/103
2018/0364306 A1\* 12/2018 Pillay ............... G01R 31/31704

\* cited by examiner

*Primary Examiner* — Paul Dinh
(74) *Attorney, Agent, or Firm* — Schwabe, Williamson & Wyatt, P.C.

(57) ABSTRACT

Embodiments include apparatuses, methods, and systems for testing an IC of an in-vehicle system of a CA/AD vehicle includes a storage device and processing circuitry coupled with the storage device. A gate level fault group is provided to include one or more gate level faults of a fault model associated to a gate level circuit element of the gate level netlist of the IC with substantially same fault controllability or observability characteristics. A correlated RTL fault group is determined to be associated to a RTL circuit node, where the RTL circuit node of the RTL netlist corresponds to the gate level circuit element. Other embodiments may also be described and claimed.

14 Claims, 6 Drawing Sheets

MULTILEVEL FAULT SIMULATIONS FOR INTEGRATED CIRCUITS (IC)

FIELD

Embodiments of the present disclosure relate generally to the technical fields of testing and fault simulation of integrated circuits (IC), with particular applications to ICs used in computer assisted or autonomous driving.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

An integrated circuit (IC) or monolithic integrated circuit (also referred to as a chip, or a microchip) includes a set of electronic circuits formed on a semiconductor material, normally silicon. ICs may perform various functions, e.g., functions in computer assisted or autonomous driving (CA/AD) vehicles, or other functions. Automatic test pattern generation (ATPG) is an electronic design automation method/technology used to find test vectors that, when applied to an IC, enables automatic test equipment to distinguish between the correct circuit behavior and the faulty circuit behavior caused by defects. Fault coverage refers to the percentage of faults that can be detected by test vectors based on a fault model during the testing of an IC. Fault simulation is to detect the fault coverage based on the fault model during the testing of an IC.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
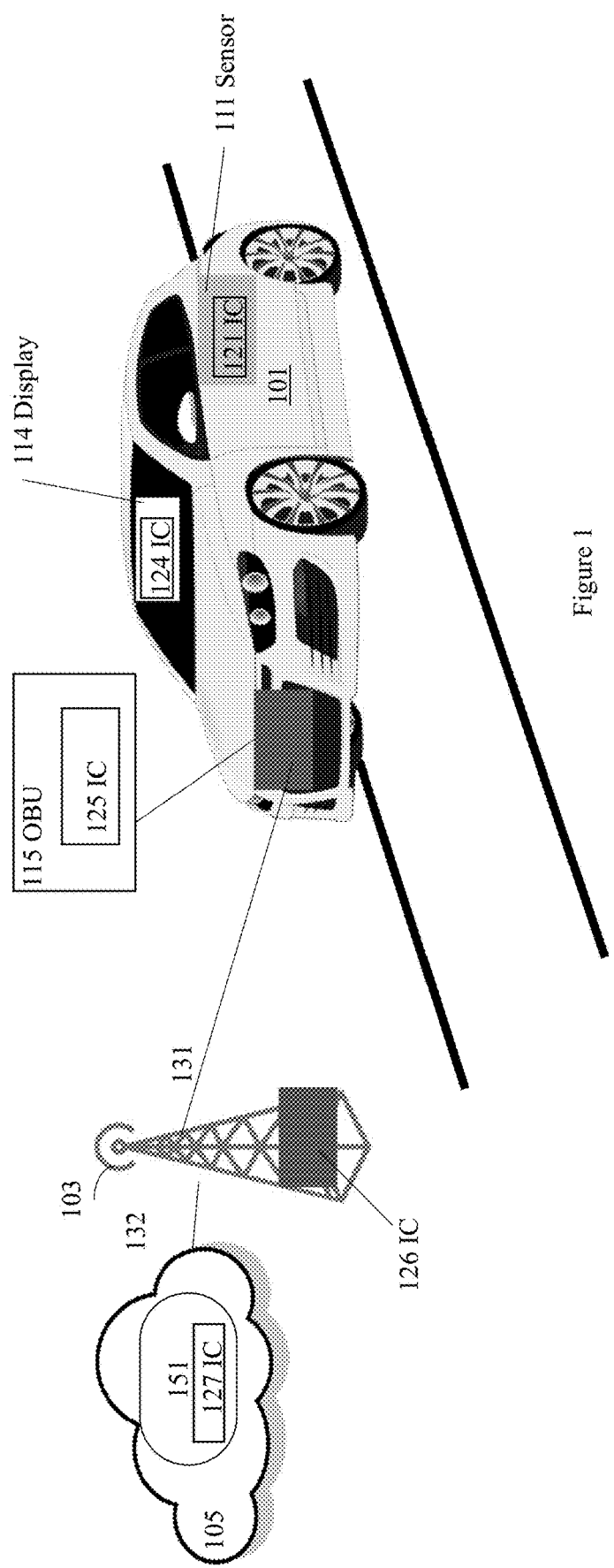
FIG. 1 illustrates an example computer assisted or autonomous driving (CA/AD) vehicle including various integrated circuits (IC), in accordance with various embodiments.

An integrated circuits (IC) may be described at various levels of abstractions, e.g., by a gate level netlist, or a register transfer level (RTL) netlist, using a hardware design language, e.g., VHDL, Verilog, or other hardware design languages. Fault coverage refers to the percentage of some type of fault that can be detected by test vectors in an automatic test pattern generation (ATPG) process based on a fault model. Fault simulation is to determine the fault coverage of modeled faults detected by test vectors during the testing of a system, e.g., an IC.

A computer assisted or autonomous driving (CA/AD) vehicle may include many ICs or device components manufactured by different parties. Functional safety is an important consideration for CA/AD vehicles. Various standard bodies, e.g., the International Organization for Standardization (ISO), have developed standards for the CA/AD vehicle industry. For example, the ISO 26262 standard, titled "Road vehicles—Functional safety," is an international standard for functional safety of electrical and/or electronic systems in computer assisted or autonomous driving vehicles. The ISO 26262 standard may specify various safety levels, e.g., Automotive Safety Integrity Level (ASIL) A, B, C or D.

Functional safety standards may specify fault injections based on a fault model to perform fault simulations at the gate level of an IC. Significant effort and costs may be used to construct a fault simulation environment at the gate level of an IC. Previous efforts to perform fault simulations based on RTL descriptions of an IC have not been successful in producing results that are correlated with gate level faults of the IC. Additional techniques, e.g., statistical sampling of a gate level fault list have not solved the problem.

Embodiments herein provides an effective way to accurately estimate fault coverage metrics for a gate level netlist of an IC without performing gate level fault simulations. Instead, fault simulations are performed on the RTL netlist using a subset of faults that can be shown to be functionally equivalent to faults in the gate level netlist. The accuracy of computed fault coverage metrics is closely aligned to the accuracy of the original gate level netlist faults.

In embodiments, a gate level fault list of a fault model extracted from a gate level netlist of an IC may be divided into one or more gate level fault groups, where each gate level fault group includes one or more gate level faults. The gate level faults in a gate level fault group is associated to a gate level circuit element of the gate level netlist of the IC with substantially same fault controllability or observability characteristics. Some gate level fault groups may have correlated RTL fault groups associated to a RTL circuit node of the RTL netlist, where the RTL circuit node corresponds to the gate level circuit element. RTL fault simulation is performed based on a fault simulation algorithm for the corresponding correlated RTL fault group associated to the corresponding RTL circuit node, to measure a fault coverage metric of the fault class for the corresponding correlated RTL fault group. Afterwards, a fault coverage metric of the fault class for the IC may be derived by combining the fault coverage metrics of the fault class for the corresponding correlated RTL fault group and a fault distribution of the each gate level fault group of the total testable gate level faults.

In embodiments, an apparatus for testing an IC of an in-vehicle system of a CA/AD vehicle includes a storage device and processing circuitry coupled with the storage device. The storage device stores a gate level netlist of the IC and a RTL netlist of the IC corresponding to the gate level netlist. The processing circuitry provides a gate level fault group including one or more gate level faults of a fault model associated to a gate level circuit element of the gate level netlist of the IC with substantially same fault controllability or observability characteristics. In addition, the processing circuitry may determine, for the gate level fault group associated to the gate level circuit element, a correlated RTL fault group includes one or more RTL faults. The correlated RTL fault group is associated to a RTL circuit node of the RTL netlist, where the RTL circuit node of the RTL netlist corresponds to the gate level circuit element of the gate level netlist.

In embodiments, a method for testing an IC of an in-vehicle system of a CA/AD vehicle is to be performed. The method includes performing, with a simulator, RTL fault simulation based on a fault simulation algorithm for a RTL fault group associated with a RTL circuit node of a RTL netlist of the IC. The RTL circuit node corresponds to a gate level circuit element of a gate level netlist of the IC, and the RTL fault group corresponds to a gate level fault group of a fault model associated with the gate level circuit element to test the IC for compliance with a functional safety standard for the IC in the in-vehicle system of the CA/AD vehicle. The method further includes classifying RTL faults of the RTL fault group by a fault class to provide a fault coverage metric of the fault class for the RTL fault group.

In embodiments, one or more non-transitory computer-readable media comprises instructions that cause processing circuitry to perform fault simulation of an IC, in response to execution of the instructions by the processing circuitry, to: extract a gate level fault list of a fault model from a gate level netlist of the IC; prune the gate level fault list to exclude one or more untestable faults to obtain a pruned gate level fault list; and classify the pruned gate level fault list to obtain one or more gate level fault groups, where each gate level fault group of the one or more gate level fault groups includes one or more gate level faults associated to a gate level circuit element of the gate level netlist of the IC with substantially same fault controllability or observability characteristics. In addition, in response to execution of the instructions by the processing circuitry, the instructions further cause the processing circuitry to determine, for each gate level fault group of the one or more gate level fault groups associated to a gate level circuit element with a corresponding RTL circuit node of a RTL netlist of the IC, a corresponding correlated RTL fault group associated to the corresponding RTL circuit node that includes one or more RTL faults; perform RTL fault simulation based on the fault simulation algorithm for the corresponding correlated RTL fault group associated to the corresponding RTL circuit node; classify a RTL fault in the corresponding correlated RTL fault group by a fault class; and measure a fault coverage metric of the fault class for the corresponding correlated RTL fault group.

In the description to follow, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

As used herein, the term semi-autonomous driving is synonymous with computer-assisted driving. The term does not mean exactly 50% of the driving functions are automated. The percentage of automated driving functions may vary between 0% and 100%. In addition, it will be appreciated that the hardware, circuitry and/or software implementing the semi-autonomous driving may temporarily provide no automation, or 100% automation, such as in response to an emergency situation.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The terminology used herein is for the purpose of describing particular embodiments only and is not intended to be limiting of the disclosure. As used herein, the singular forms "a," "an" and "the" are intended to include plural forms as well, unless the context clearly indicates otherwise. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

As used hereinafter, including the claims, the term "unit," "module," or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example CA/AD vehicle 101 including various ICs, in accordance with various embodiments. For clarity, features of the CA/AD vehicle 101, and various ICs, e.g., an IC 121, an IC 124, an IC 125, an IC 126, or an IC 127, are described below as an example for understanding an example CA/AD vehicle and various ICs. It is to be understood that there may be more or fewer components included in the CA/AD vehicle 101 and various ICs. Further, it is to be understood that one or more of the devices and components within the CA/AD vehicle 101 and various ICs may include additional and/or varying features from the description below, and may include any devices and components that one having ordinary skill in the art would consider and/or refer to as the CA/AD vehicle and various ICs.

In embodiments, the CA/AD vehicle 101 communicates with a roadside unit (RSU) 103, and a cloud computing environment ("cloud" for short) 105. [As used herein, unless the context clearly indicates otherwise, the term "cloud" does not refer to a visible mass of condensed water vapor floating in the atmosphere/sky.] The cloud 105 includes a number of cloud servers 151, which may include e.g., an application server. The communication between the RSU 103, the cloud 105, or the cloud server 151, and the CA/AD vehicle 101 may be a part of a vehicle-to-infrastructure (V2I) communications. For example, the CA/AD vehicle 101 may communicate with the RSU 103, the cloud 105, or the cloud server 151, via a wireless technology 131. The wireless technology 131 may include a selected one of dedicated short range communications (DSRC) technology, Bluetooth technology, wireless fidelity (WiFi) technology, wireless local network (WLAN), cellular wireless network technology, short range radio technology, or any other wireless technology. In addition, the RSU 103 may communicate with the cloud 105 by a link 132, which may be a wireless or wired connection.

In embodiments, the CA/AD vehicle 101 includes a vehicle onboard unit (OBU) 115, various sensors, e.g., a sensor 111, a display 114, and other components, not shown. Various ICs, e.g., the IC 121, the IC 124, the IC 125, the IC 126, or the IC 127 may be included in the sensor 111, the display 114, the OBU 115, the RSU 103, or the cloud server 151, respectively, to perform various functions associated with the CA/AD vehicle 101, the RSU 103, or the cloud 105.

In embodiments, the CA/AD vehicle 101 may be any type of motorized vehicle or device used for transportation of people or goods, which may be equipped with controls used for driving, parking, passenger comfort and/or safety, etc. The terms "motor", "motorized", etc., as used herein may refer to devices that convert one form of energy into mechanical energy, and may include internal combustion engines (ICE), compression combustion engines (CCE), electric motors, and hybrids (e.g., including an ICE/CCE and electric motor(s)). For example, the CA/AD vehicle 101 is a selected one of a commercial truck, a light duty car, a sport utility vehicle (SUV), a light vehicle, a heavy duty vehicle, a pickup truck, a van, a car, or a motorcycle.

In embodiments, the RSU 103 may be one or more hardware computer devices configured to provide wireless communication services to mobile devices (for example, OBU 115 in the CA/AD vehicle 101 or some other suitable device) within a coverage area or cell associated with the RSU 103. The RSU 103 includes a transmitter/receiver (or alternatively, a transceiver) connected to one or more antennas, one or more memory devices, one or more processors, one or more network interface controllers, and/or other like components. The one or more transmitters/receivers are configured to transmit/receive data signals to/from one or more mobile devices via a link. Furthermore, one or more network interface controllers are configured to transmit/receive with various network elements (e.g., one or more servers within a core network, etc.) over another backhaul connection (not shown).

As an example, the RSU 103 may be a base station associated with a cellular network (e.g., an eNB in an LTE network, a gNB in a new radio access technology (NR) network, a WiMAX base station, etc.), a remote radio head, a relay radio device, a small cell base station (e.g., a femtocell, picocell, home evolved nodeB (HeNB), and the like), or other like network element. In addition, the RSU 103 may be a road embedded reflector, a smart street or traffic light, a road side tag, or a stationary user equipment (UE) type RSU.

In embodiments, the cloud 105 may represent the Internet, one or more cellular networks, a local area network (LAN) or a wide area network (WAN) including proprietary and/or enterprise networks, transfer control protocol (TCP)/internet protocol (IP)-based network, or combinations thereof. In such embodiments, the cloud 105 may be associated with network operator who owns or controls equipment and other elements necessary to provide network-related services, such as one or more base stations or access points (e.g., the RSU 103), one or more servers for routing digital data or telephone calls (for example, a core network or backbone network), etc. Implementations, components, and protocols used to communicate via such services may be those known in the art and are omitted herein for the sake of brevity.

In some embodiments, the cloud 105 may be a system of computer devices (e.g., servers, storage devices, applications, etc. within or associated with a data center or data warehouse) that provides access to a pool of computing resources. The term "computing resource" refers to a physical or virtual component within a computing environment and/or within a particular computer device, such as memory space, processor time, electrical power, input/output operations, ports or network sockets, and the like. In these embodiments, the cloud 105 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 105 and database systems) may coordinate the delivery of data to the OBU 115 of the CA/AD vehicle 101. Implementations, components, and protocols used to communicate via such services may be those known in the art and are omitted herein for the sake of brevity.

Figure 2:
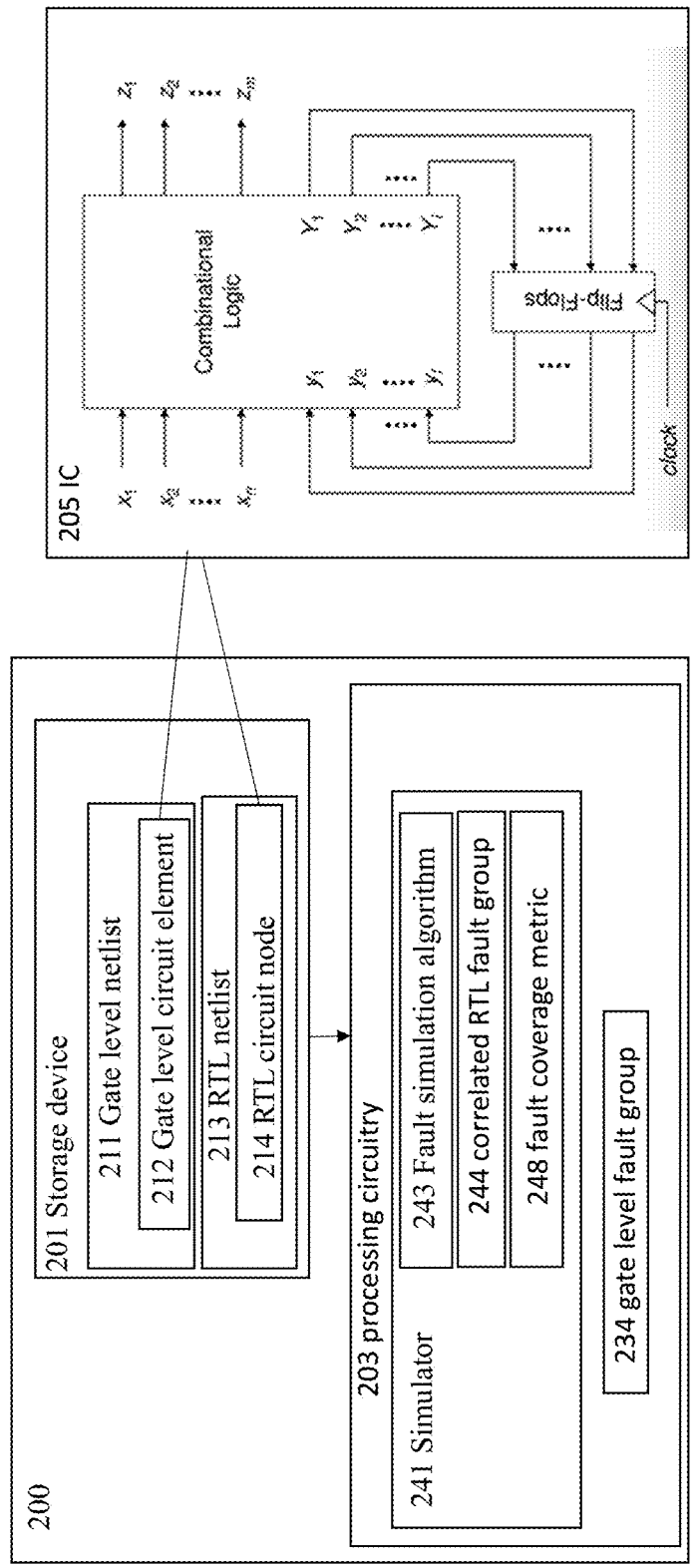
FIG. 2 illustrates an example apparatus for performing multilevel fault simulations for an IC, in accordance with various embodiments.

FIG. 2 illustrates an example apparatus 200 for performing multilevel fault simulations for an IC 205, in accordance with various embodiments. In embodiments, the IC 205 may be an example of the IC 121, the IC 124, the IC 125, the IC 126, or the IC 127, of the CA/AD vehicle 101, as described in FIG. 1. In some other embodiments, the IC 205 may be used in any other applications not related to the CA/AD vehicle 101.

In embodiments, the apparatus 200 includes a storage device 201, and processing circuitry 203 coupled with the storage device 201, to perform multilevel fault simulations for the IC 205. The storage device 201 stores a gate level netlist 211 of the IC 205, and a RTL netlist 213 of the IC 205 corresponding to the gate level netlist 211. The gate level netlist 211 includes one or more gate level circuit elements, e.g., a gate level circuit element 212, and the RTL netlist 213 includes one or more RTL circuit nodes, e.g., a RTL circuit node 214. The gate level circuit element 212 may be a selected one of a combinatorial logic gate, a flip-flop, a latch, a clock pin of a sequential logic circuit, a scan pin of a sequential logic circuit, a standard cell input pin, or a standard cell output pin. The RTL circuit node 214 corresponds to the gate level circuit element 212, determined by logic equivalence checking, simulation-based equivalence checking, binary decision diagrams based equivalence checking, or conjunctive normal form satisfiability equivalence checking.

In embodiments, the processing circuitry 203 is to provide a gate level fault group 234, which includes one or more gate level faults of a fault model associated to the gate level circuit element 212. The one or more gate level faults of the gate level fault group 234 may have substantially same fault controllability or observability characteristics. The one or more gate level faults of the gate level fault group 234 are based on a same fault model, which may include stuck-at-fault, bridging fault, current leak fault, transistor stuck-at-fault, functional fault, memory fault, delay fault, or state transition fault.

In embodiments, the processing circuitry 203 determines a correlated RTL fault group 244 for the gate level fault group 234 associated to the gate level circuit element 212. The correlated RTL fault group 244 includes one or more RTL faults. The correlated RTL fault group 244 is associated to the RTL circuit node 214. The RTL circuit node 214 corresponds to the gate level circuit element 212.

In embodiments, the processing circuitry 203 performs a RTL fault simulation, by a simulator 241, based on a fault simulation algorithm 243, for the correlated RTL fault group 244 associated to the RTL circuit node 214. The simulator 241 may test the IC 205 for compliance with a functional safety standard for the IC 205 in an in-vehicle system of a CA/AD vehicle, e.g., the CA/AD vehicle 101. In some other embodiments, the simulator 241 may perform fault simulation for the IC 205 based on other fault metrics. The fault simulation algorithm 243 may include a serial fault simulation algorithm, a parallel fault simulation algorithm, a deductive fault simulation algorithm, a concurrent fault simulation algorithm, or a differential fault simulation algorithm.

In embodiments, the processing circuitry 203 may further classify a RTL fault in the correlated RTL fault group 244 by a fault class, and measure a fault coverage metric 248 of the fault class for the correlated RTL fault group 244. The fault class may include a detectable fault class, a potentially detectable fault class, or an observable but not detectable fault class.

Figure 3:
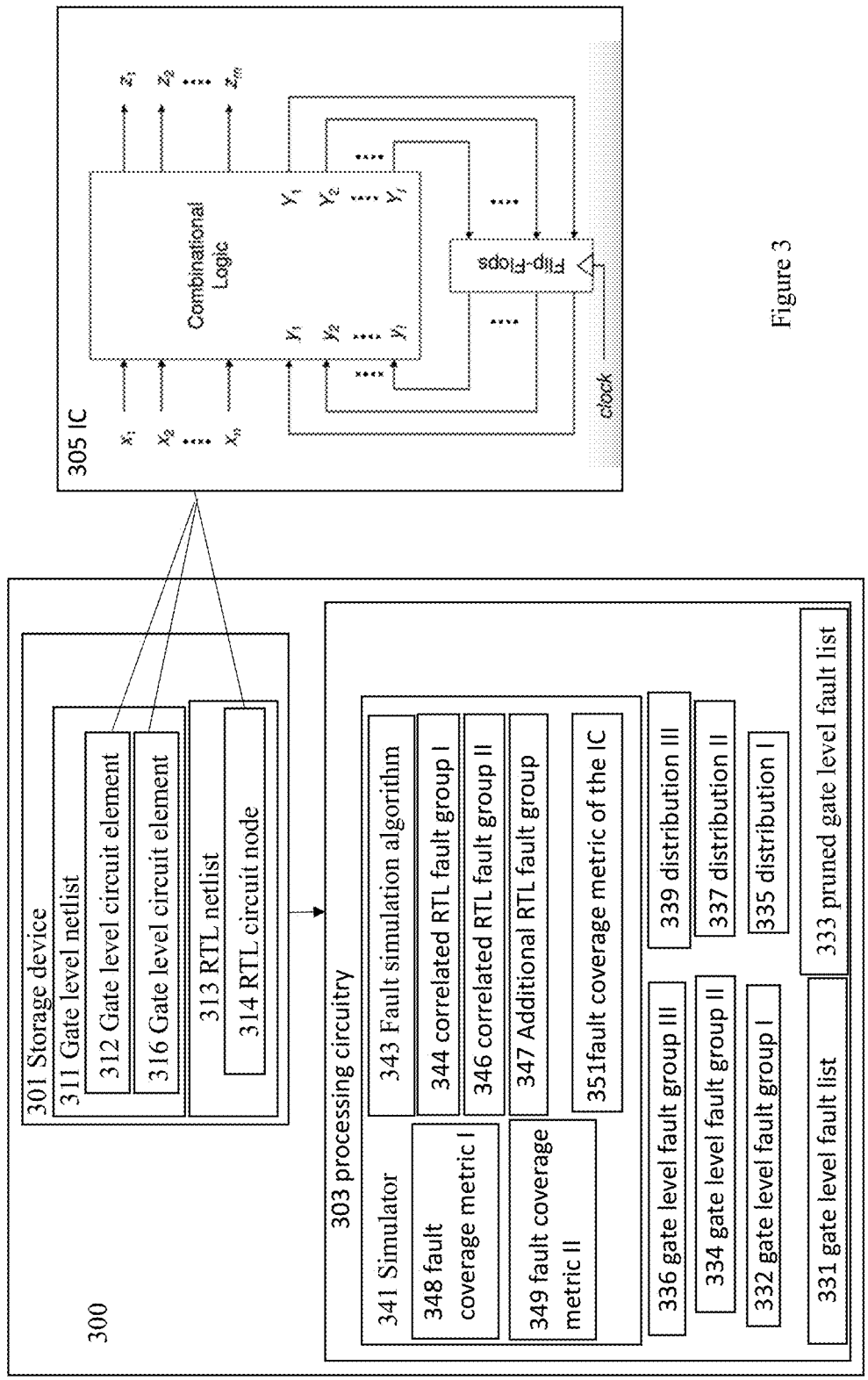
FIG. 3 illustrates another example apparatus for performing multilevel fault simulations for an IC, in accordance with various embodiments.

FIG. 3 illustrates another example apparatus 300 for performing multilevel fault simulations for an IC 305, in accordance with various embodiments. In embodiments, the IC 305 may be an example of the IC 121, the IC 124, the IC 125, the IC 126, or the IC 127, of the CA/AD vehicle 101, as described for FIG. 1, or an example of the IC 205 as described for FIG. 2.

In embodiments, the apparatus 300 includes a storage device 301, and processing circuitry 303 coupled with the storage device 301, to perform multilevel fault simulations for the IC 305. The storage device 301 stores a gate level netlist 311 of the IC 305, and a RTL netlist 313 of the IC 305 corresponding to the gate level netlist 311. The gate level netlist 311 includes one or more gate level circuit elements, e.g., a gate level circuit element 312, and a gate level circuit element 316, while the RTL netlist 313 includes one or more RTL circuit nodes, e.g., a RTL circuit node 314. The RTL circuit node 314 corresponds to the gate level circuit element 312, determined by an equivalence checking. Not all gate level circuit elements of the gate level netlist 311 has a corresponding RTL circuit node 314. For example, the gate level circuit element 316 does not have a corresponding RTL circuit node, which may be called as a non-corresponding gate level circuit element.

In embodiments, the processing circuitry 303 is to extract a gate level fault list 331 of a fault model from the gate level netlist 311, and prune the gate level fault list 331 to exclude one or more untestable faults to obtain a pruned gate level fault list 333. The one or more untestable faults may include a blocked fault, a tied-off fault, a redundant fault, an unobservable fault, or an uncontrollable fault.

In embodiments, the processing circuitry 303 is to classify the pruned gate level fault list 333 to obtain one or more gate level fault groups, e.g., a gate level fault group 332, a gate level fault group 334, a gate level fault group 336, and more. A gate level fault group, e.g., the gate level fault group 332, the gate level fault group 334, or the gate level fault group 336, includes one or more gate level faults based on a same fault model. Each gate level fault group, e.g., the gate level fault group 332, the gate level fault group 334, or the gate level fault group 336 includes one or more gate level faults associated to a gate level circuit element of the gate level netlist 311 of the IC 305 with substantially same fault controllability or observability characteristics. For example, the gate level fault group 332 includes one or more gate level faults associated to the gate level circuit element 312 with substantially same fault controllability or observability characteristics. Similarly, the gate level fault group 336 includes one or more gate level faults associated to the gate level circuit element 316 with substantially same fault controllability or observability characteristics.

Each of the gate level fault groups, e.g., e.g., the gate level fault group 332, the gate level fault group 334, or the gate level fault group 336 has a fault distribution calculated based on the number of gate level faults in the gate level fault group. For example, the gate level fault group 332 has a fault distribution 335, the gate level fault group 334 has a fault distribution 337, and the gate level fault group 336 has a fault distribution 339. The fault distribution of a gate level fault group, e.g., the gate level fault group 332, the gate level fault group 334, or the gate level fault group 336, is determined by the percentage of the one or more gate level faults of the gate level fault group compared to the total number of gate level faults of the pruned gate level fault list 333. For example, the fault distribution 335 of the gate level fault group 332 is determined by a percentage of the number of gate level faults in the gate level fault group 332 compared to the total number of gate level faults in the pruned gate level fault list 333.

For example, the following table shows multiple gate level fault groups in the first column including one or more gate level faults associated to the gate level circuit element. The second column lists the number of gate level faults of the gate level fault group, while the third column lists the fault distribution of the gate level fault group compared to the total number of gate level faults in the pruned gate level fault list. For example, the second row includes a gate level fault group including 282862 gate level faults associated to a gate level circuit element, e.g., sequential ports—clk, with a fault distribution of 4.06%, calculated as (282862/6973718), where 6973718 is the total number of gate level faults in the pruned gate level fault list 333.

| Fault Group | # gate level faults | Fault distribution (%) |
|---|---|---|
| sequential ports - vcc | 0 | 0.00% |
| sequential ports - clk | 282862 | 4.06% |
| sequential ports - scan | 344438 | 4.94% |
| sequential ports - func output | 280526 | 4.02% |

| Fault Group | # gate level faults | Fault distribution (%) |
|---|---|---|
| sequential ports - func remaining | 789092 | 11.32% |
| combo ports - vcc | 0 | 0.00% |
| combo ports - clk | 0 | 0.00% |
| combo ports - scan | 0 | 0.00% |
| combo ports - func remaining | 5276800 | 75.67% |
| # total sequential ports | 1696918 | 24.33% |
| # total combo ports | 5276800 | 75.67% |
| # total sequential and combo ports | 6973718 | 100.00% |

In embodiments, the processing circuitry 303 is further to determine, for each gate level fault group associated to a gate level circuit element with a corresponding RTL circuit node, a corresponding correlated RTL fault group associated to the corresponding RTL circuit node. For example, the gate level fault group 332 includes one or more gate level faults associated to the gate level circuit element 312, while the gate level circuit element 312 has corresponding RTL circuit node 314. A RTL fault group 344 is determined as a corresponding correlated RTL fault group associated to the corresponding RTL circuit node 314. The RTL fault group 344 includes one or more RTL faults associated to the corresponding RTL circuit node 314. Similarly, the gate level fault group 334 has a corresponding correlated RTL fault group 346 including one or more RTL faults.

In embodiments, the gate level fault group 336 is a non-corresponding gate level fault group, which does not have a corresponding correlated RTL fault group. The gate level fault group 336 is associated with a non-corresponding gate level circuit element 316 of the gate level netlist 311, and the non-corresponding gate level circuit element 316 does not have a corresponding RTL circuit node of the RTL netlist 313.

In embodiments, the processing circuitry 303 is further to perform RTL fault simulation, by a simulator 341, based on a fault simulation algorithm 343 for the corresponding correlated RTL fault groups associated to the corresponding RTL circuit nodes. For example, the processing circuitry 303 is to perform RTL fault simulation for the corresponding correlated RTL fault group 344 associated to the corresponding RTL circuit node 314. Similarly, the processing circuitry 303 is to perform RTL fault simulation for the corresponding correlated RTL fault group 346 associated to a corresponding RTL circuit node. In embodiments, the RTL fault simulation performed for the corresponding correlated RTL fault group 344 associated to the corresponding RTL circuit node 314 may be similar to the RTL fault simulation performed for the correlated RTL fault group 244 associated to the corresponding RTL circuit node 214, as described in FIG. 2.

In embodiments, the processing circuitry 303 is further to classify a RTL fault in the corresponding correlated RTL fault group by a fault class, and measure a fault coverage metric of the fault class for the corresponding correlated RTL fault group. The fault class may include a detectable fault class, a potentially detectable fault class, or an observable but not detectable fault class. For example, the processing circuitry 303 is to classify a RTL fault in the correlated RTL fault group 344 by a fault class, and measure a fault coverage metric 348 of the fault class for the correlated RTL fault group 344. Similarly, the processing circuitry 303 is to classify a RTL fault in the correlated RTL fault group 346 by a fault class, and measure a fault coverage metric 349 of the fault class for the correlated RTL fault group 346.

In embodiments, the processing circuitry 303 is further to derive a fault coverage metric 351 of the fault class for the IC 305 by combining the fault coverage metrics of the fault class for the corresponding correlated RTL fault group based on a fault distribution of the each gate level fault group, and the fault coverage metric of the fault class for the corresponding correlated RTL fault group. For example, for a fault class, the fault coverage metric 351 may be a sum of (fault coverage metric 348*the fault distribution 335), (fault coverage metric 349*the fault distribution 337), and other corresponding products of other fault coverage metric and fault distribution for other gate level fault groups, where the fault coverage metric 348 of the fault class is for the correlated RTL fault group 344, the fault coverage metric 349 of the fault class is for the correlated RTL fault group 346, the fault distribution 335 is for the gate level fault group 332, and the fault distribution 337 is for the gate level fault group 334.

In some embodiments, before performing the fault simulation by the simulator 341, based on the fault simulation algorithm 343 for the corresponding correlated RTL fault groups, the processing circuitry 303 may estimate an accuracy of the fault coverage metric of the fault class for the corresponding correlated RTL fault group associated to the corresponding RTL circuit node for the each gate level fault group associated to the gate level circuit element with the corresponding RTL circuit node. If the estimated accuracy of the fault coverage metric of the fault class is not acceptable based on a threshold, the processing circuitry 203 may generate one or more additional correlated RTL fault group, e.g., an additional correlated RTL fault group 347. Additional fault simulation may be performed on the additional correlated RTL fault group, e.g., the additional correlated RTL fault group 347, so that the final fault coverage metric 351 of the fault class for the IC 305 is acceptable by the threshold.

Figure 4:
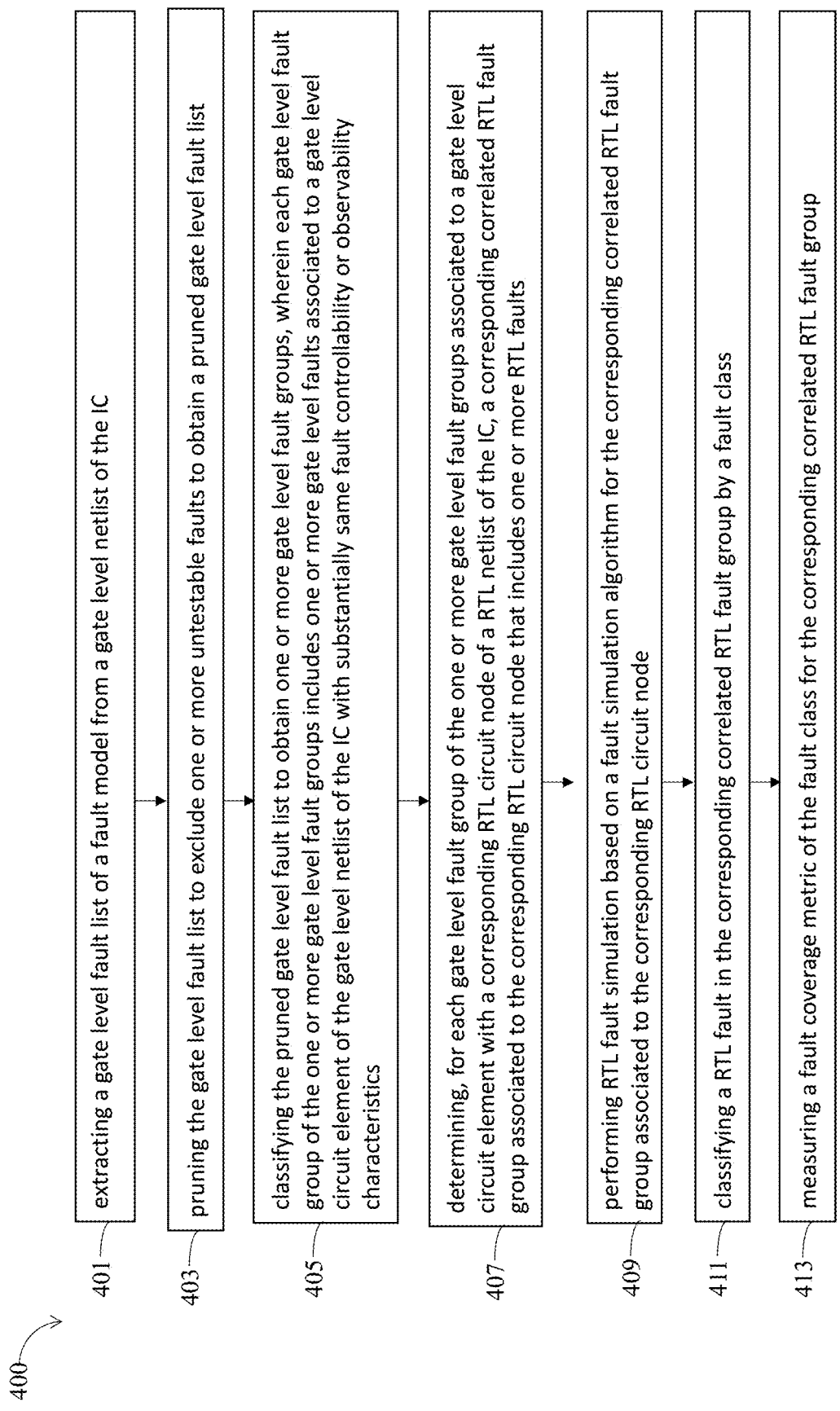
FIG. 4 illustrates an example process for performing multilevel fault simulations for an IC, in accordance with various embodiments.

FIG. 4 illustrates an example process 400 for performing multilevel fault simulations for an IC, in accordance with various embodiments. In embodiments, the process 400 may be a multilevel fault simulation process performed by the apparatus 300 for an IC, e.g., the IC 121, the IC 124, the IC 125, the IC 126, or the IC 127, of the CA/AD vehicle 101, as described for FIG. 1, the IC 205 as described for FIG. 2, or the IC 305 as described for FIG. 3.

The process 400 may start at an interaction 401. During the interaction 401, a gate level fault list of a fault model may be extracted from a gate level netlist of the IC. For example, at the interaction 401, the gate level fault list 331 is extracted from the gate level netlist 311.

During an interaction 403, the gate level fault list may be pruned to exclude one or more untestable faults to obtain a pruned gate level fault list. For example, at the interaction 403, the gate level fault list 331 is pruned to exclude one or more untestable faults to obtain the pruned gate level fault list 333.

During an interaction 405, the pruned gate level fault list may be classified to obtain one or more gate level fault groups, wherein each gate level fault group of the one or more gate level fault groups includes one or more gate level faults associated to a gate level circuit element of the gate level netlist of the IC with substantially same fault controllability or observability characteristics. For example, at the interaction 405, the pruned gate level fault list 333 is classified to obtain the gate level fault group 332, the gate level fault group 334, and the gate level fault group 336, each gate level fault group includes one or more gate level faults associated to a gate level circuit element of the gate level netlist 311 of the IC 305 with substantially same fault controllability or observability characteristics.

During an interaction 407, for each gate level fault group of the one or more gate level fault groups associated to a gate level circuit element with a corresponding RTL circuit node of a RTL netlist of the IC, a corresponding correlated RTL fault group associated to the corresponding RTL circuit node is determined, where the corresponding correlated RTL fault group includes one or more RTL faults. For example, at the interaction 407, for the gate level fault group 332 associated to the gate level circuit element 312, a corresponding correlated RTL fault group 344 associated to the corresponding RTL circuit node 314 is determined. Similarly, for the gate level fault group 334, a corresponding correlated RTL fault group 346 associated to a corresponding RTL circuit node is also determined.

During an interaction 409, RTL fault simulation may be performed based on a fault simulation algorithm for the corresponding correlated RTL fault group associated to the corresponding RTL circuit node. For example, at the interaction 409, RTL fault simulation is performed based on a fault simulation algorithm 343 for the corresponding correlated RTL fault group 344 associated to the corresponding RTL circuit node 314.

During an interaction 411, a RTL fault in the corresponding correlated RTL fault group is classified by a fault class. For example, at the interaction 411, a RTL fault in the corresponding correlated RTL fault group 344 is classified by a fault class.

During an interaction 413, a fault coverage metric of the fault class for the corresponding correlated RTL fault group is measured. For example, at the interaction 413, the fault coverage metric 348 of the fault class for the corresponding correlated RTL fault group 344 is measured.

Figure 5:
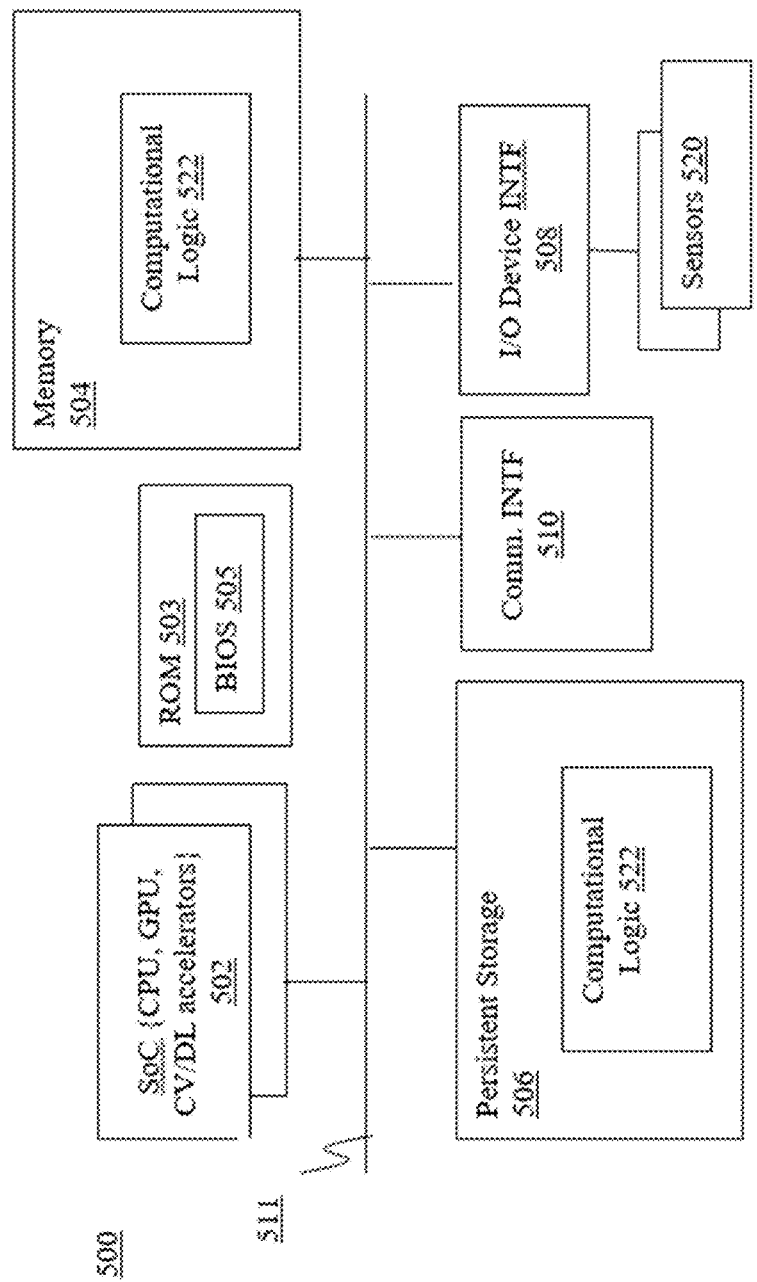
FIG. 5 illustrates a hardware component view of a computing platform used in a CA/AD vehicle or an apparatus for performing multilevel fault simulations of an IC, in accordance with various embodiments.

FIG. 5 illustrates a hardware component view of a computing platform 500 used in a CA/AD vehicle or an apparatus for performing multilevel fault simulations of an IC, in accordance with various embodiments. As shown, the computing platform 500, which may be an in-vehicle system of the CA/AD vehicle 101, the apparatus 200 of FIG. 2, or the apparatus 300 of FIG. 3, may include one or more SoCs 502, ROM 503 and system memory 504. Each SoCs 502 may include one or more processor cores (CPUs), one or more graphics processor units (GPU), one or more accelerators, such as computer vision (CV) and/or deep learning (DL) accelerators. ROM 503 may include BIOS 505. CPUs, GPUs, and CV/DL accelerators may be any one of a number of these elements known in the art. Similarly, ROM 503 and basic input/output system services (BIOS) 505 may be any one of a number of ROM and BIOS known in the art, and system memory 504 may be any one of a number of volatile storage known in the art.

Additionally, computing platform 500 may include persistent storage devices 506. Example of persistent storage devices 506 may include, but are not limited to, flash drives, hard drives, compact disc read-only memory (CD-ROM) and so forth. Further, computing platform 500 may include input/output devices 508 (such as display, keyboard, cursor control and so forth) and communication interfaces 510 (such as network interface cards, modems and so forth). In some embodiments, e.g., embodiments used for an in-vehicle system of the CA/AD vehicle 101, computing platform 500 may further include a number of sensors 520. Communication and I/O devices 508 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G) and so forth. The elements may be coupled to each other via system bus 512, which may represent one or more buses. In the case of multiple buses, they may be bridged by one or more bus bridges (not shown). Sensors 520 may include light detection and ranging (LiDAR) sensors, geo-positioning sensors, gyroscopes, accelerometers, temperature sensors, humidity sensors, and so forth.

Each of these elements may perform its conventional functions known in the art. In particular, ROM 503 may include BIOS 505 having a boot loader. In embodiments, system memory 504 and mass storage devices 506 may be employed to store a working copy and a permanent copy of the programming instructions implementing the operations associated with the apparatus 200, the apparatus 300 to perform multilevel fault simulations for an IC, collectively referred to as computational logic 522. The various elements may be implemented by assembler instructions supported by processor core(s) of SoCs 502 or high-level languages, such as, for example, C, that can be compiled into such instructions. In embodiments, one or more ICs, e.g., SoCs 502, ROM 503, memory 504, or ICs used in persistent storage 506, communication interface 510, I/O device interface 508, and/or sensors 520 may be ICs having gone through functional and safety standard testing in accordance with the present disclosure, as earlier described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 6:
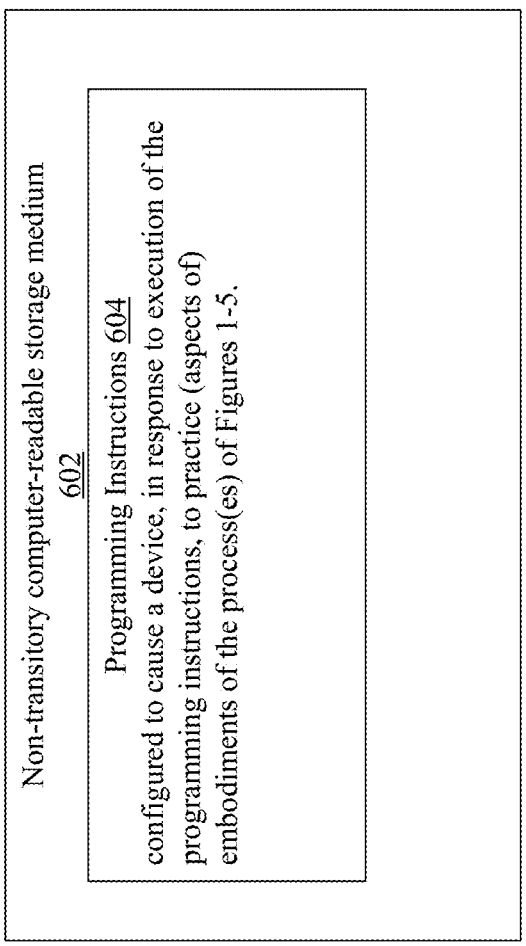
FIG. 6 illustrates a storage medium having instructions for practicing methods described with references to FIGS. 1-5, in accordance with various embodiments.

FIG. 6 illustrates a storage medium having instructions for practicing methods described with references to FIGS. 1-5, in accordance with various embodiments. As shown, non-transitory computer-readable storage medium 602 may include a number of programming instructions 604. Programming instructions 604 may be configured to enable a device, e.g., computing platform 500, in response to execution of the programming instructions, to implement (aspects of) operations associated with the apparatus 200, the apparatus 300 to perform multilevel fault simulations for an IC. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for testing an integrated circuit (IC) of an in-vehicle system of a computer-assisted or autonomous driving (CA/AD) vehicle, comprising: a storage device to store a gate level netlist of the IC and a register transfer level (RTL) netlist of the IC corresponding to the gate level netlist; processing circuitry, coupled with the storage device, the processing circuitry to: provide a gate level fault group includes one or more gate level faults of a fault model associated to a gate level circuit element of the gate level netlist of the IC with substantially same fault controllability or observability characteristics; and determine, for the gate level fault group associated to the gate level circuit element, a correlated RTL fault group associated to a RTL circuit node of the RTL netlist, wherein the RTL circuit node of the RTL netlist corresponds to the gate level circuit element of the gate level netlist, and the correlated RTL fault group includes one or more RTL faults.

Example 2 may include the apparatus of example 1 and/or some other examples herein, wherein the gate level circuit element includes a selected one of a combinatorial logic gate, a flip-flop, a latch, a clock pin of a sequential logic circuit, a scan pin of a sequential logic circuit, a standard cell input pin, or a standard cell output pin.

Example 3 may include the apparatus of example 1 and/or some other examples herein, wherein the fault model includes stuck-at-fault, bridging fault, current leak fault, transistor stuck-at-fault, functional fault, memory fault, delay fault, or state transition fault.

Example 4 may include the apparatus of example 1 and/or some other examples herein, wherein the RTL circuit node of the RTL netlist corresponding to the gate level circuit element of the gate level netlist is determined by logic equivalence checking, simulation-based equivalence checking, binary decision diagrams based equivalence checking, or conjunctive normal form satisfiability equivalence checking.

Example 5 may include the apparatus of example 1 and/or some other examples herein, wherein the processing circuitry is further to: perform a RTL fault simulation based on a fault simulation algorithm for the correlated RTL fault group associated to the RTL circuit node, to test the IC for compliance with a functional safety standard for the IC in the in-vehicle system of the CA/AD vehicle.

Example 6 may include the apparatus of example 5 and/or some other examples herein, wherein the fault simulation algorithm includes a serial fault simulation algorithm, a parallel fault simulation algorithm, a deductive fault simulation algorithm, a concurrent fault simulation algorithm, or a differential fault simulation algorithm.

Example 7 may include the apparatus of example 5 and/or some other examples herein, wherein the processing circuitry is further to: classify a RTL fault in the correlated RTL fault group by a fault class; and measure a fault coverage metric of the fault class for the correlated RTL fault group.

Example 8 may include the apparatus of example 7 and/or some other examples herein, wherein the fault class includes a detectable fault class, a potentially detectable fault class, or an observable but not detectable fault class.

Example 9 may include the apparatus of example 7 and/or some other examples herein, wherein the gate level fault group associated to the gate level circuit element is a first gate level fault group associated to a first gate level circuit element, and the processing circuitry is further to: extract a gate level fault list of the fault model from the gate level netlist of the IC; prune the gate level fault list to exclude one or more untestable faults to obtain a pruned gate level fault list; and classify the pruned gate level fault list to obtain one or more gate level fault groups, wherein the one or more gate level fault groups includes the first gate level fault group associated to the first gate level circuit element, each gate level fault group of the one or more gate level fault groups includes one or more gate level faults associated to a gate level circuit element of the gate level netlist of the IC with substantially same fault controllability or observability characteristics.

Example 10 may include the apparatus of example 9 and/or some other examples herein, wherein the one or more untestable faults include a blocked fault, a tied-off fault, a redundant fault, an unobservable fault, or an uncontrollable fault.

Example 11 may include the apparatus of example 9 and/or some other examples herein, the processing circuitry is further to: determine, for each gate level fault group of the one or more gate level fault groups associated to a gate level circuit element with a corresponding RTL circuit node, a corresponding correlated RTL fault group associated to the corresponding RTL circuit node, wherein the corresponding correlated RTL fault group includes one or more RTL faults; perform RTL fault simulation based on a fault simulation algorithm for the corresponding correlated RTL fault group associated to the corresponding RTL circuit node; classify a RTL fault in the corresponding correlated RTL fault group by a fault class; and measure a fault coverage metric of the fault class for the corresponding correlated RTL fault group.

Example 12 may include the apparatus of example 11 and/or some other examples herein, wherein there exists an non-corresponding gate level fault group of the one or more gate level fault groups, the non-corresponding gate level fault group is associated with an non-corresponding gate level circuit element of the gate level netlist, and the non-corresponding gate level circuit element does not have a corresponding RTL circuit node of the RTL netlist.

Example 13 may include the apparatus of example 11 and/or some other examples herein, the processing circuitry is further to: estimate an accuracy of the fault coverage metric of the fault class for the corresponding correlated RTL fault group associated to the corresponding RTL circuit node for the each gate level fault group associated to the gate level circuit element with the corresponding RTL circuit node; generate additional correlated RTL fault groups for the one or more gate level fault groups based on the estimated accuracy and a threshold; and perform RTL fault simulation based on the fault simulation algorithm for the additional correlated RTL fault groups.

Example 14 may include the apparatus of example 11 and/or some other examples herein, wherein the processing circuitry is further to: derive a fault coverage metric of the fault class for the IC by combining the fault coverage metrics of the fault class for the corresponding correlated RTL fault group and a fault distribution of the each gate level fault group of the pruned gate level fault list.

Example 15 may include a method for testing an integrated circuit (IC) of an in-vehicle system of a computer-assisted or autonomous driving (CA/AD) vehicle, comprising: performing, with a simulator, RTL fault simulation based on a fault simulation algorithm for a RTL fault group associated with a RTL circuit node of a RTL netlist of the IC, the RTL circuit node corresponding to a gate level circuit element of a gate level netlist of the IC, the RTL fault group corresponding to a gate level fault group of a fault model associated with the gate level circuit element to test the IC for compliance with a functional safety standard for the IC in the in-vehicle system of the CA/AD vehicle; and classifying RTL faults of the RTL fault group by a fault class to provide a fault coverage metric of the fault class for the RTL fault group.

Example 16 may include the method of example 15 and/or some other examples herein, wherein: the fault class includes a detectable fault class, a potentially detectable fault class, or an observable but not detectable fault class; the fault model includes stuck-at-fault, bridging fault, current leak fault, transistor stuck-at-fault, functional fault, memory fault, delay fault, or state transition fault; and the RTL circuit node of the RTL netlist corresponding to the gate level circuit element of the gate level netlist is determined by logic equivalence checking, simulation-based equivalence checking, binary decision diagrams based equivalence checking, or conjunctive normal form satisfiability equivalence checking.

Example 17 may include the method of example 15 and/or some other examples herein, wherein the gate level fault group associated to the gate level circuit element is a first gate level fault group associated to a first gate level circuit element, and the method further comprises: extracting a gate level fault list of the fault model from the gate level netlist of the IC; pruning the gate level fault list to exclude one or more untestable faults to obtain a pruned gate level fault list; classify the pruned gate level fault list to obtain one or more gate level fault groups, wherein the one or more gate level fault groups includes the first gate level fault group associated to the first gate level circuit element, each gate level fault group of the one or more gate level fault groups includes one or more gate level faults associated to a gate level circuit element of the gate level netlist of the IC with substantially same fault controllability or observability characteristics; determine, for each gate level fault group of the one or more gate level fault groups associated to a gate level circuit element with a corresponding RTL circuit node, a corresponding correlated RTL fault group associated to the corresponding RTL circuit node, wherein the corresponding correlated RTL fault group includes one or more RTL faults; perform RTL fault simulation based on a fault simulation algorithm for the corresponding correlated RTL fault group associated to the corresponding RTL circuit node; classify a RTL fault in the corresponding correlated RTL fault group by a fault class; and measure a fault coverage metric of the fault class for the corresponding correlated RTL fault group.

Example 18 may include the method of example 17 and/or some other examples herein, further comprising: deriving a fault coverage metric of the fault class for the IC by combining the fault coverage metrics of the fault class for the corresponding correlated RTL fault group and a fault distribution of the each gate level fault group of the pruned gate level fault list.

Example 19 may include the method of example 17 and/or some other examples herein, further comprising: estimating an accuracy of the fault coverage metric for the corresponding correlated RTL fault group associated to the corresponding RTL circuit node for the each gate level fault group associated to the gate level circuit element with the corresponding RTL circuit node; generating additional correlated RTL fault groups for the one or more gate level fault groups based on the estimated accuracy and a threshold; and performing RTL fault simulation based on the fault simulation algorithm for the additional correlated RTL fault groups.

Example 20 may include one or more non-transitory computer-readable media comprising instructions that cause processing circuitry to perform fault simulation of an integrated circuit (IC), in response to execution of the instructions by the processing circuitry, to: extract a gate level fault list of a fault model from a gate level netlist of the IC; prune the gate level fault list to exclude one or more untestable faults to obtain a pruned gate level fault list; classify the pruned gate level fault list to obtain one or more gate level fault groups, wherein each gate level fault group of the one or more gate level fault groups includes one or more gate level faults associated to a gate level circuit element of the gate level netlist of the IC with substantially same fault controllability or observability characteristics; determine, for each gate level fault group of the one or more gate level fault groups associated to a gate level circuit element with a corresponding RTL circuit node of a RTL netlist of the IC, a corresponding correlated RTL fault group associated to the corresponding RTL circuit node that includes one or more RTL faults; perform RTL fault simulation based on the fault simulation algorithm for the corresponding correlated RTL fault group associated to the corresponding RTL circuit node; classify a RTL fault in the corresponding correlated RTL fault group by a fault class; and measure a fault coverage metric of the fault class for the corresponding correlated RTL fault group.

Example 21 may include the one or more non-transitory computer-readable media of example 20 and/or some other examples herein, wherein the instructions further cause the processing circuitry, in response to execution of the instructions by the processing circuitry, to: derive a fault coverage metric of the fault class for the IC by combining the fault coverage metrics of the fault class for the corresponding correlated RTL fault group and a fault distribution of the each gate level fault group of the pruned gate level fault list.

Example 22 may include the one or more non-transitory computer-readable media of example 20 and/or some other examples herein, wherein the instructions further cause the processing circuitry, in response to execution of the instructions by the processing circuitry, to: estimate an accuracy of the fault coverage metric for the corresponding correlated RTL fault group associated to the corresponding RTL circuit node for the each gate level fault group associated to the gate level circuit element with the corresponding RTL circuit node; generate additional correlated RTL fault groups for the one or more gate level fault groups based on the estimated accuracy and a threshold; and perform RTL fault simulation based on the fault simulation algorithm for the additional correlated RTL fault groups.

Example 23 may include the one or more non-transitory computer-readable media of example 20 and/or some other examples herein, wherein the gate level netlist of the IC or the RTL netlist of the IC is described with Verilog, VHDL, or a hardware description language; and the fault class includes a detectable fault class, a potentially detectable fault class, or an observable but not detectable fault class.

Example 24 may include the one or more non-transitory computer-readable media of example 20 and/or some other examples herein, wherein: the fault model includes stuck-at-fault, bridging fault, current leak fault, transistor stuck-at-fault, functional fault, memory fault, delay fault, or state transition fault; the fault simulation algorithm includes a serial fault simulation algorithm, a parallel fault simulation algorithm, a deductive fault simulation algorithm, a concurrent fault simulation algorithm, or a differential fault simulation algorithm; and the RTL circuit node of the RTL netlist corresponding to the gate level circuit element of the gate level netlist is determined by logic equivalence checking, simulation-based equivalence checking, binary decision diagrams based equivalence checking, or conjunctive normal form satisfiability equivalence checking.

Example 25 may include the one or more non-transitory computer-readable media of example 20 and/or some other examples herein, wherein the gate level circuit element includes a selected one of a combinatorial logic gate, a flip-flop, a latch, a clock pin of a sequential logic circuit, a scan pin of a sequential logic circuit, a standard cell input pin, or a standard cell output pin.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for testing an integrated circuit (IC) of an in-vehicle system of a computer-assisted or autonomous driving (CA/AD) vehicle, comprising:
a storage device to store a gate level netlist of the IC and a register transfer level (RTL) netlist of the IC of the in-vehicle system of the CA/AD vehicle, corresponding to the gate level netlist, wherein the gate level netlist includes a non-corresponding gate level circuit element of the IC, and a gate level circuit element of the IC, and wherein the gate level circuit element has a corresponding RTL circuit node in the RTL netlist, and the non-corresponding gate level circuit element does not have a corresponding RTL circuit node in the RTL netlist;
processing circuitry, coupled with the storage device, the processing circuitry to:
provide a gate level fault group that includes one or more gate level faults of a fault model associated to the gate level circuit element with substantially same fault controllability or observability characteristics; and
determine, for the gate level fault group associated to the gate level circuit element, a correlated RTL fault group associated to the RTL circuit node corresponding to the gate level circuit element, wherein the correlated RTL fault group includes one or more RTL faults.

2. The apparatus of claim 1, wherein the gate level circuit element includes a selected one of a combinatorial logic gate, a flip-flop, a latch, a clock pin of a sequential logic circuit, a scan pin of a sequential logic circuit, a standard cell input pin, or a standard cell output pin.

3. The apparatus of claim 1, wherein the fault model includes stuck-at-fault, bridging fault, current leak fault, transistor stuck-at-fault, functional fault, memory fault, delay fault, or state transition fault.

4. The apparatus of claim 1, wherein the RTL circuit node of the RTL netlist corresponding to the gate level circuit element of the gate level netlist is determined by logic equivalence checking, simulation-based equivalence checking, binary decision diagrams based equivalence checking, or conjunctive normal form satisfiability equivalence checking.

5. The apparatus of claim 1, wherein the processing circuitry is further to:
perform an RTL fault simulation based on a fault simulation algorithm for the correlated RTL fault group associated to the RTL circuit node, to test the IC for compliance with a functional safety standard for the IC in the in-vehicle system of the CA/AD vehicle.

6. The apparatus of claim 5, wherein the fault simulation algorithm includes a serial fault simulation algorithm, a parallel fault simulation algorithm, a deductive fault simulation algorithm, a concurrent fault simulation algorithm, or a differential fault simulation algorithm.

7. The apparatus of claim 5, wherein the processing circuitry is further to:
classify an RTL fault in the correlated RTL fault group by a fault class; and
measure a fault coverage metric of the fault class for the correlated RTL fault group.

8. The apparatus of claim 7, wherein the fault class includes a detectable fault class, a potentially detectable fault class, or an observable but not detectable fault class.

9. The apparatus of claim 7, wherein the gate level fault group associated to the gate level circuit element is a first gate level fault group associated to a first gate level circuit element, and the processing circuitry is further to:
extract a gate level fault list of the fault model from the gate level netlist of the IC;
prune the gate level fault list to exclude one or more untestable faults to obtain a pruned gate level fault list; and
classify the pruned gate level fault list to obtain one or more gate level fault groups, wherein the one or more gate level fault groups includes the first gate level fault group associated to the first gate level circuit element, each gate level fault group of the one or more gate level fault groups includes one or more gate level faults associated to a gate level circuit element of the gate level netlist of the IC with substantially same fault controllability or observability characteristics.

10. The apparatus of claim 9, wherein the one or more untestable faults include a blocked fault, a tied-off fault, a redundant fault, an unobservable fault, or an uncontrollable fault.

11. The apparatus of claim 9, wherein the processing circuitry is further to:
determine, for each gate level fault group of the one or more gate level fault groups associated to a gate level circuit element with a corresponding RTL circuit node, a corresponding correlated RTL fault group associated to the corresponding RTL circuit node, wherein the corresponding correlated RTL fault group includes one or more RTL faults;
perform RTL fault simulation based on a fault simulation algorithm for the corresponding correlated RTL fault group associated to the corresponding RTL circuit node;
classify a RTL fault in the corresponding correlated RTL fault group by a fault class; and
measure a fault coverage metric of the fault class for the corresponding correlated RTL fault group.

12. The apparatus of claim 11, wherein there exists a non-corresponding gate level fault group of the one or more gate level fault groups, and the non-corresponding gate level fault group is associated with the non-corresponding gate level circuit element of the gate level netlist.

13. The apparatus of claim 11, wherein the processing circuitry is further to:
estimate an accuracy of the fault coverage metric of the fault class for the corresponding correlated RTL fault group associated to the corresponding RTL circuit node for the each gate level fault group associated to the gate level circuit element with the corresponding RTL circuit node;
generate additional correlated RTL fault groups for the one or more gate level fault groups based on the estimated accuracy and a threshold; and
perform RTL fault simulation based on the fault simulation algorithm for the additional correlated RTL fault groups.

14. The apparatus of claim 11, wherein the processing circuitry is further to:
derive a fault coverage metric of the fault class for the IC by combining the fault coverage metrics of the fault class for the corresponding correlated RTL fault group and a fault distribution of the each gate level fault group of the pruned gate level fault list.

* * * * *